(12) United States Patent
Yamamoto et al.

(10) Patent No.: US 6,367,981 B1
(45) Date of Patent: *Apr. 9, 2002

(54) RETAINER AND ROLLING BEARING HAVING THE SAME

(75) Inventors: Toyohisa Yamamoto; Takahiko Uchiyama, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/379,613

(22) Filed: Aug. 24, 1999

(30) Foreign Application Priority Data

| Aug. 24, 1998 | (JP) | ............................................. 10-237304 |
| Nov. 11, 1998 | (JP) | ............................................. 10-320986 |
| Jul. 8, 1999 | (JP) | ............................................. 11-194676 |

(51) Int. Cl.[7] ............................................... F16C 33/44
(52) U.S. Cl. ........................................ 384/527; 384/909
(58) Field of Search ............................... 384/527, 576, 384/523, 572, 910, 911, 909

(56) References Cited

U.S. PATENT DOCUMENTS 4,660,996 A * 4/1987 Marshall
5,988,891 A * 11/1999 Yamamoto ................... 384/463

FOREIGN PATENT DOCUMENTS

| JP | 55-57717 | 4/1980 | ............ F16C/33/04 |
| JP | 61-55410 | 3/1986 | ............ F16C/33/66 |
| JP | 62-151539 | 7/1987 | ............... C22C/9/08 |
| JP | 64-79418 | 3/1989 | ............ F16C/33/38 |
| JP | 2-245514 | 10/1990 | ............ F16C/33/10 |
| JP | 4-102718 | 4/1992 | ............ F16C/33/58 |
| JP | 4-331819 | 11/1992 | ............ F16C/33/56 |
| JP | 2709119 | 10/1997 | ............ F16C/33/44 |

* cited by examiner

Primary Examiner—Lenard A. Footland
(74) Attorney, Agent, or Firm—Sughrue Mion, PLLC

(57) ABSTRACT

A retainer constituting a rolling bearing is formed by melt-molding a resin composition containing a polyvinylidene fluoride resin as a main component.

5 Claims, 6 Drawing Sheets

RETAINER AND ROLLING BEARING HAVING THE SAME

BACKGROUND OF THE INVENTION

1. Field of the Invention

The present invention relates to a rolling bearing having self-lubricating and a retainer using therefor.

2. Description of the Related Art

When used in an environment where a clean atmosphere is required, such as clean room, semiconductor producing apparatus, liquid crystal panel producing apparatus and hard disc producing apparatus and in a liquid or an environment where a mist or spray of liquid is present, such as various cleaning apparatus and food processing machines, a rolling bearing cannot be lubricated by any lubricant or grease. Therefore, a self-lubricating rolling bearing which doesn't need to be lubricated by lubricant or grease has heretofore been proposed.

As such a self-lubricating rolling bearing, there is disclosed in Japanese Patent No. 2,709,119 a rolling bearing comprising inner and outer rings made of stainless steel, a retainer prepared only by forming a tetrafluoroethylene-ethylene copolymer (ETFE) comprising a potassium titanate whisker short fiber having a diameter of not more than 2 $\mu$m incorporated therein and a rolling body made of hard carbon. This bearing is arranged such that when the retainer and the rolling body come in frictional contact with each other, ETFE constituting the retainer is partially transferred to the rolling body and the inner and outer rings to form a thin film of ETFE thereon.

JP-A-4-331819 (The term "JP-A" as used herein means an "unexamined Japanese patent publication (kokai)") discloses that a retainer is formed by a perfluoroalkoxy resin (PFA) comprising a heat-resistant fiber incorporated therein.

The retainers disclosed in the above cited publications can be produced by melt molding and thus have a higher productivity than retainers made of polytetrafluoroethylene (PTFE), which cannot be melt-molded. However, since ETPE and PFA have a relatively low elastic modulus, retainers made of these materials are liable to deformation during use under a high load or at high rotary speed. Further, these retainers can easily generate heat at contact points due to friction. This can result in the locking of the bearing or the development of abnormal abrasion in the retainers. Accordingly, rolling bearings comprising the retainers disclosed in the above cited patents may exhibit a shortened life under a high load or at high rotary speed.

Further, for the production of these retainers made of FTFE or PFA, the mold temperature or resin temperature at which these materials are melt-molded needs to be raised because these materials have a high melting point (melting point of ETFE: 260° C.–270° C.; melting point of PFA: 300° C.–310° C.). The higher the resin temperature is, the more easily can be produced a corrosive fluorine-based gas. The heat thus generated and the corrosion by fluorine-based gas shorten the life of the mold.

A rolling bearing comprises an inner ring having a groove on the outer periphery thereof, an outer ring having a groove on the inner wall thereof, a plurality of rolling bodies rollably disposed between the groove on the inner ring and the outer ring, and a retainer in which the plurality of rolling bodies are retained in such an arrangement that they are guided through the gap between the groove on the inner ring and the outer ring.

In general, a rolling bearing is lubricated by circulative supply of lubricant or grease into the bearing or incorporation of lubricant or grease in the interior of the bearing. However, when operated at elevated temperatures or in vacuum, a rolling bearing is liable to the scattering of lubricant or grease to the exterior of the bearing or the evaporation of lubricant or grease accompanied by the release of gas that can stain the external atmosphere of the bearing. Thus, no lubricants or greases can be used in the case where a pure atmosphere is required, e.g., in clean room, semiconductor element producing apparatus, liquid crystal panel producing apparatus, hard disc producing apparatus, and in other atmospheres, e.g., at elevated temperatures, in vacuum, in a special atmosphere, at extremely low temperatures, under irradiation.

Thus, as a method for lubricating rolling bearing there has heretofore been proposed a method free from lubricant or grease. For example, JP-A-55-57717 and JP-A-61-55410 disclose an approach involving the formation of a thin lubricating film made of molybdenum disulfide, graphite, silver, lead or the like on a part or the whole of the surface of inner ring, outer ring, retainer and rolling body by sputtering, ion plating, sintering, etc.

Further, JP-A-62-151539 and JP-A-64-79418 disclose the formation of a rolling bearing retainer by a sintered alloy obtained by sintering a material having a metal powder mixed with a solid lubricant such as molybdenum disulfide, graphite and hexagonal boron nitride. Moreover, JP-A-2-245514 and JP-A-4-102718 disclose an approach involving the formation of a rolling bearing retainer by a material comprising a resin composition having a solid lubricant incorporated in a plastic. In these rolling bearings, when the retainer and the rolling body come in frictional contact with each other, the material constituting the retainer is somewhat transferred to the rolling body, inner ring and outer ring to form thereon a thin lubricating film of the solid lubricant contained in the retainer material.

With the enhancement of the properties of devices and the production yield thereof, the temperature at which these devices are produced has been raised more and more, and the pressure under which these devices are produced has been reduced more and more. Under these circumstances, there is a growing demand for rolling bearings which can operate while scattering little particles to the exterior thereof in a severe atmosphere, e.g., at higher temperatures or under higher vacuum, over an extended period of time.

However, the approaches disclosed in these patents have the following disadvantages.

In other words, the approaches disclosed in JP-A-55-57717 and JP-A-61-55410 are disadvantageous in that the frictional force developed on the contact surface upon the operation of the bearing causes the thin lubricating film which has previously been formed on the surface of the grooves to be abraded to disappearance. The disappearance of the lubricating film causes the elimination of the lubricating effect. This results in the cohesion and seizing of the base metal (matrix). In general, accordingly, a rolling bearing which is thus lubricated can hardly operate over an extended period of time.

The retainer made of a sintered metal disclosed in JP-A-62-151539 and JP-A-64-79418 is disadvantageous in that it is very expensive. This is because a sintered metal cannot be formed into a complicated shape by molding and a rod or ring molded product of sintered metal must be machined to obtain a retainer having a desired shape. Further, a sintered metal normally exhibits an excellent heat resistance but shows a low mechanical strength and is brittle. Thus, a sintered metal can be cracked on the surface thereof when machined. As a result, a sintered metal must be slowly machined and thus shows a poor machinability.

Moreover, the approaches disclosed in JP-A-2-245514 and JP-A-4-102718 are disadvantageous in that if the plastic used as matrix of the retainer material has an insufficient lubricity, its lubricating effect is lost early during the operation of the bearing, causing rapid rise in the generation of abrasion particles. As a result, a large amount of particles are scattered from the bearing to the exterior of the bearing. Further, the resulting torque rise can terminate the life of the bearing. As the plastic having a high lubricity employable as matrix there may be used polytetrafluoroethylene (PFTE) resin. However, this resin cannot be melt-molded (melt molding is a method which comprises heating a resin to a temperature higher than its melting point, and then allowing the fluid resin to be cured in a desired shape in a mold) and thus needs to be machined to form a retainer similarly to the sintered metal as mentioned above. As a result, the production cost is raised. Further, if the plastic to be used as matrix of the retainer has an insufficient heat resistance, the rolling bearing exhibits remarkably deteriorated abrasion resistance or lubricity when operated at high temperatures. Thus, the generation of abrasion particles shows a rapid increase. Accordingly, a large amount of particles are scattered to the exterior of the bearing. Further, the resulting torque rise can terminate the life of the bearing.

In general, a melt-moldable plastic has a relatively low glass transition point or melting point and thus can hardly exhibit an improved heat resistance in a high temperature atmosphere. On the contrary, a plastic having an excellent heat resistance cannot be heat-molded. Thus, heat resistance and moldability cannot stand together. A thermoplastic polyimide, polyether nitrile or the like is a plastic which exhibits an excellent heat resistance but can be melt-molded. However, since such a plastic is relatively poor in fluidity, it is liable to cracking in the tip or curved portion such as lip for holding rolling bodies during the melt molding of retainer. Thus, such a plastic leaves something to be desired in moldability.

SUMMARY OF THE INVENTION

It is an object of the present invention to prolong the life of a rolling bearing which is rendered self-lubricating when a synthetic resin material constituting a retainer is partially transferred thereto under a high load or upon high speed rotation as well as prolong the life of the mold for retainer so as to enhancing the mass-producibility of the retainer.

It is another object of the present invention to provide a rolling bearing having a retainer formed by a material containing a solid lubricant incorporated therein which can be kept fairly lubricated scattering little particles to the exterior of the bearing even in a high temperature atmosphere over an extended period of time and can be produced at low cost.

According to a first aspect of the present invention, a retainer constituting a rolling bearing obtained by melt-molding a polyvinylidene fluoride resin (PVdF) or a resin composition comprising a polyvinylidene fluoride resin as a main component. The chemical formula of PVdF is —(CH$_2$CF$_2$)$_n$—.

According to a second aspect of the present invention, a rolling bearing comprises the retainer according to the first aspect.

The retainer according to the first aspect is formed by a PVdF, which has a high elastic modulus than ETFE and PFA, or a resin composition containing PVdF as a main component. Thus, when operated incorporated in a rolling bearing under a high load or at a high rotary speed, the retainer according to the first aspect is less liable to deformation and generates less heat upon friction at the contact point than retainers formed by ETFE or PFA or a resin composition containing ETFE or PFA as a main component. Accordingly, the rolling bearing having such a retainer (rolling bearing according to the second aspect) exhibits a longer life under a high load or at a high rotary speed than rolling bearings comprising a retainer formed by ETFE or PFA or a resin composition comprising ETFE or PFA as a main component.

Further, the melting point of PVdF is from about 160° C. to 180° C. and thus is remarkably lower than that of ETFE or PFA. Thus, the mold temperature and the resin temperature at which the resin composition is melt-molded can be lowered from that required for ETFE or PFA. In this arrangement, the production of highly corrosive fluorine gas can be inhibited. Further, the thermal deformation of the mold can be inhibited, making it possible to prolong the life of the mold as compared with the case where ETFE or PFA is used.

The retainer according to the first aspect is formed by melt-molding PVdF or a resin composition containing PVdF as a main component and thus can be obtained at a higher productivity than retainers containing PTFE as a main component. The melt-molding of the resin composition can be accomplished by a known molding method such as injection molding, compression molding and transfer molding. In particular, injection molding, which gives an excellent productivity, can be employed to reduce the production cost of retainer to advantage.

The rolling bearing according to the second aspect can be kept self-lubricating over an extended period of time even if no lubricants or greases are supplied into the interior of the bearing because when the retainer mainly composed of PVdF comes in frictional contact with the rolling body, PVdF is transferred to the rolling body to for a thin PVdF lubricant film thereon. In other words, since the rolling bearing according to the second aspect requires no lubricants or greases to be supplied in the interior thereof, the external atmosphere cannot be stained by lubricant or grease.

The rolling bearing according to the third aspect comprising an inner ring, an outer ring, a rolling body and a retainer. The retainer is obtained by melt-molding a resin composition containing a melt-moldable heat-resistant resin blended with a liquid crystal polymer and a solid lubricant.

The resin composition contains a melt-moldable heat-resistant resin as a main component (in an amount of, e.g., not less than 50% by weight based on the total weight of the resin composition) and a liquid crystal polymer and a solid lubricant as essential components besides the main component. The resin composition exhibits a raised fluidity during melt molding due to the incorporation of liquid crystal polymer and thus can be fairly melt-molded to form a self-lubricating retainer having an excellent heat resistance. The retainer thus obtained by melt-molding the resin composition can hardly be cracked at the tip or curved portion such as lip for holding rolling bodies. Further, the resin composition thus melted can solidify at a raised rate when cooled in the mold and thus can hardly be burred. Moreover, when injection molding is used as melt molding, the resin composition can be molded at a relatively low injection pressure.

Further, when the resin composition is kneaded or molded, the heat-resistant resin and the liquid crystal polymer undergo fibrillation to exert a self-reinforcing effect. Thus, the retainer obtained by melt-molding the resin composition has a sufficient mechanical strength required for retainer.

Thus, the retainer constituting the rolling bearing of the present invention not only has self-lubricating properties and excellent heat resistance but also is a product of high precision melt molding. In this arrangement, the rolling bearing according to the present invention can be kept fairly lubricated scattering little particles to the exterior of the bearing even in a high temperature atmosphere over an extended period of time and can be produced at low cost.

DETAILED DESCRIPTION OF THE INVENTION

Figure 1:
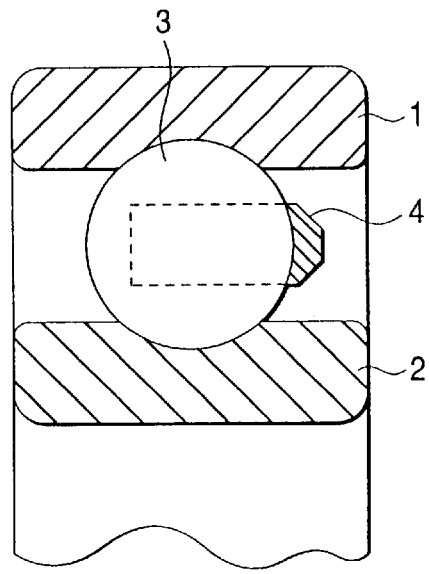
FIG. 1 is a schematic sectional view illustrating a rolling bearing corresponding to an embodiment of the present invention.

Detailed description of the present invention will be described as follows.

First Embodiment

A retainer constituting a rolling bearing according to the present invention is obtained by melt-molding a polyvinylidene fluoride resin (PvdF) or a resin composition containing a polyvinylidene fluoride resin as a main component. The chemical formula of PVdF is —$(CH_2CF_2)_n$—. A rolling bearing according to the present invention is provided with the retainer.

The resin composition constituting the retainer of the present invention preferably contains at least one of solid lubricant and fibrous filler incorporated therein.

Examples of the solid lubricant which can be incorporated in the resin composition include polytetrafluoroethylene (PTFER) powder, graphite, hexagonal boron nitride (hBN), fluorine mica, melamine cyanurate (MCA), amino acid compound (N-lauro-L-lysine) having a lamellar crystalline structure, fluorinated graphite, fluorinated pitch, and molybdenum disulfide ($MoS_2$). A retainer formed by the resin composition containing such a solid lubricant incorporated therein in a proper amount exhibits improved self-lubricating properties. In the rolling bearing having such a retainer, the solid lubricant is transferred to the surface of the rolling body besides PVdF, not only enhancing the self-lubricating properties of the bearing but also lessening the abrasion of the lubricating film thus formed.

The content of the solid lubricant, in any, is preferably not more than 40% by weight. Even if the content of the solid lubricant exceeds 40% by weight, further enhancement of lubricating effect cannot be expected. Further, the mechanical strength of the retainer as molded product is lowered. Thus, the retainer can be abraded more, occasionally shortening the bearing life. The content of the solid lubricant is more preferably not more than30%by weight. The content of the solid lubricant is preferably not less than 5% by weight.

The average particle diameter of the solid lubricant to be incorporated in the resin composition is not specifically limited. In practice, however, it is preferably from not less than 0.1 $\mu$m to not more than 60 $\mu$m. If the average particle diameter of the solid lubricant falls below 0.1 $\mu$m, the solid lubricant is liable to cohesion of particles when it is mixed with PVdF to be used as main component, occasionally causing the particles to be ununiformly dispersed. On the contrary, if the average particle diameter of the solid lubricant exceeds 60 $\mu$m, the molded product thus formed has a deteriorated surface smoothness and a lowered strength, occasionally shortening the life of the bearing. The average particle diameter of the solid lubricant to be incorporated in the resin composition is more preferably from not less than 0.1 $\mu$m to not more than 20 $\mu$m, even more preferably from less than not less than 0.1 $\mu$m to not more than 10 $\mu$m.

Examples of the fibrous filler which can be incorporated in the resin composition include aluminum borate whisker, potassium titanate whisker, aramide fiber, aromatic polyimide fiber, liquid crystal polyester fiber, graphite whisker, glass fiber, carbon fiber, boron fiber, silicon carbide whisker, silicon nitride whisker, alumina whisker, aluminum nitride whisker, and wollastonite. A retainer formed by the resin composition containing such a fibrous filler incorporated therein exhibits an enhanced mechanical strength and abrasion resistance and thus is much less liable to deformation or abrasion during the operation of the bearing. Thus, the bearing can be stably operated over a longer period of time.

The fibrous filler to be incorporated in the resin composition preferably has an aspect ratio of from not less than 3 to not more than 200. If the fibrous filler to bemused has an aspect ratio of less than 3, the resulting retainer cannot be fully reinforced. On the contrary, if the fibrous filler to be used has an aspect ratio of more than 200, the resulting fibrous filler can hardly be uniformly dispersed in the resin composition. The aspect ratio is more preferably from 10 to 100. Further, the diameter of fibers constituting the fibrous filler is not specifically limited. In practice, however, it is preferably from not less than 0.2 μm to not more than 30 μm, more preferably from not less than 0.3 μm to not more than 20 μm.

The content of the fibrous filler to be incorporated in the resin composition is preferably not more than 40% by weight. Even if the content of the fibrous filler in the resin composition exceeds 40% by weight, no further enhancement of the mechanical strength can be expected. Further, fluidity of the resin composition during melt molding is drastically deteriorated. The content of the fibrous filler is more preferably from not less than 5% by weight to not more than 30% by weight.

Further, from the standpoint of fluidity during melt molding and the mechanical strength of the molded product, the sum of the content of the solid lubricant and the fibrous filler in the resin composition is preferably not more than 60% by weight, more preferably from not less than 5% by weight to not more than 50% by weight. Even if the content of the solid lubricant and the fibrous filler in the resin composition each are not more than 40% by weight, when the sum of the content of the two components exceeds 60% by weight, the resulting resin composition exhibits a drastically deteriorated fluidity during melt molding and the resulting molded product exhibits a drastically deteriorated mechanical strength.

The fibrous filler to be incorporated in the resin composition may be subjected to surface treatment with a silane-based or titanate-based coupling agent for the purpose of enhancing the adhesivity to PVdF as matrix or allowing itself to be uniformly dispersed in the matrix or other surface treatments depending on purposes.

The resin composition may contains various additives such as oxidation inhibitor, heat stabilizer, ultraviolet absorber, optical protector, fire retardant, antistat, fluidity modifier, amorphous tackifier, crystallization accelerator, nucleating agent, pigment and dye incorporated therein so far as the effect of the present invention cannot be impaired.

The method for mixing the resin composition with the solid lubricant and fibrous filler is not specifically limited. The solid lubricant, fibrous filler, and additives may be successively added to PVdF as main component which has been melted with stirring. Alternatively, these materials may be previously mixed in a mixer such as Henschel mixer, tumbler, ribbon mixer and ball mill from which it is then supplied into a melt mixer where it is then melt-kneaded. As such a melt mixer, there may be used a known melt kneading machine such as twin-screw extruder, kneading roll, pressure kneader, Banbury mixer and Brabender Plastograph. The temperature at which melt kneading is effected is arbitrary so far as PVdF to be used as main component can be thoroughly melted and cannot undergo decomposition.

In the rolling bearing employing the retainer according to the present invention, the material of the inner ring, outer ring and rolling body is not specifically limited. For example, bearing steel such as SUJ2 steel, stainless steel-based metal material such as SUS440C, ES-1 (code used in NSK LTD.) and SUS630, and ceramics materials such as silicon nitride ($Si_3N_4$), silicon carbide (SiC), SIALON, partially-stabilized zirconia ($ZrO_2$) and alumina ($Al_2O_3$) can be used. The stainless steel "ES-1 has a C content of from 0.44 to 0.46% by weight, an Si content of from 0.20 to 0.40% by weight, an Mn content of from 0.20 to 0.40% by weight, a Cr content of from 12.8 to 13.2% by weight and an N content of from 0.09 to 0.18% by weight.

The rolling body is preferably made of the stainless steel-based metal material or ceramics material from the standpoint of corrosion resistance. Further, a rolling body composed of ceramics on the surface thereof or in the entire part thereof exhibits a drastically enhanced corrosion resistance as compared with those formed by stainless steel. Such a rolling body is little liable to corrosion even if contaminated by a corrosive aqueous solution such as acid and alkali. Further, even if the contamination by such a corrosive aqueous solution makes it impossible to allow the formation of a lubricant film on the rolling body by the transfer of lubricant, cohesion can hardly occur between the rolling body and the groove on the inner and outer rings so far as the surface or the whole of the rolling body is formed by ceramics. Thus, the rolling bearing thus arranged can be operated over an extended period of time even if contaminated by such a corrosive aqueous solution.

The first embodiment according to the present invention will be further described in the following examples.

As a rolling bearing to be tested there was assembled a deep groove ball bearing corresponding to Model No. 6000 of NSK LTD. As shown in FIG. 1, this bearing has an outer ring 1, an inner ring 2, a ball (rolling body) 3, and a crown-shaped retainer 4 and is free of seal.

The materials constituting the inner ring, outer ring, rolling body and retainer of the various retainers are set forth in Table 1 below. The inner ring and the outer ring were made of the same material. The preparation of the retainer from PVdF alone or a resin composition containing PVdF was carried out by injection molding. As PVdF and the materials constituting the resin composition there, were used the following materials.

Resin as main component:
PvdF: "Kureha KF Polymer T-#850", produced by Kureha Chemical Industry Co., Ltd.
ETFE: "Neoflon ETFE EP-520", produced by DAIKIN INDUSTRIES LTD.
PFA: "Neoflon PFA AP-201", produced by DAIKIN INDUSTRIES LTD.

Fibrous filler:
Aluminum borate whisker (abbreviated as "ABW" in Table 1): "Alborex YS1", produced by Shikoku Chemicals Corp. (average fiber diameter: 0.5 to 1.0 μm; length: 10 to 30 μm)
Potassium titanate whisker (abbreviated as "KTW" in Table 1): "Tismo D-101", produced by Otsuka Chemical Co., Ltd. (average fiber diameter: 0.3–0.6 μm; length: 10–20 μm)
Carbon fiber: "Kurekachop M-102S", produced by Kureha Chemical Industry Co., Ltd. (average fiber diameter: 14.5 μm; length: 0.2 mm)
Glass fiber: "FESS-005-1250", produced by Fuji Fiber Glass Co., Ltd. (average fiber diameter: 10 μm; length: 0.5 mm)

Solid lubricant:
PTFE; "Lubron L-5", produced by DAIKIN INDUSTRIES LTD. (powder having an average particle diameter of 0.2 μm)
MCA: Melamine cyanurate, produced by Mitsubishi Chemical Corporation (powder having an average particle diameter of 2.0 μm)
Fluorine mica: "Synthetic Mica PDM-9WA", produced by TOPY INDUSTRIES, LTD. (average particle diameter: 8 μm)

Hexagonal boron nitride (hBN): "Hexagonal boron nitride GP", produced by DENKI KAGAKU KOGYO K.K. (average particle diameter 2 μm)

Molybdenum disulfide (MoS₂): "Molysulfide", produced by Nihon Climax Molybdenum Development Co., Ltd. (technical fine grade; average particle diameter: 7 μm)

If a resin composition containing a main component resin and a fibrous filler was used, the content of the main component resin and the fibrous filler in the resin composition were 80% by weight and 20% by weight, respectively. If a resin composition containing a main component resin and a solid lubricant was used, the content of the main component resin and the solid lubricant in the resin composition were 80% by weight and 20% by weight, respectively. If a resin composition containing a main component resin, a fibrous filler and a solid lubricant was used, the content of the main component resin, the fibrous filler and the solid lubricant in the resin composition were 70% by weight, 10% by weight and 20% by weight, respectively.

The mixing of the resin components was carried out in such a manner that the fibrous filler cannot break. In some detail, the resin components except the fibrous filler are dry-mixed in a Henschel mixer. The mixture is then put into a twin-screw extruder. The fibrous filler is supplied into the twin-screw extruder through a constant rate side feeder so that it is kneaded with the mixture. The mixture thus kneaded is then extruded to form pellets. The pelletized resin composition thus obtained was supplied into an injection molding machine from which it was then injection-molded under optimum conditions depending on the kind of the resin composition.

Using a bearing rotation testing machine produced by NSK LTD., the various rolling bearings thus assembled were each then subjected to rotary test in pure water under the following conditions to evaluate the life thereof based on vibration value. In some detail, radial vibration developed on the bearing was always measured during the rotary test. When the vibration value reached three times the initial value, the test was suspended. The number of rotations made so far was determined as bearing life. None of the rolling bearings were lubricated by grease.

<Rotary test conditions>
Ambient pressure: Atmospheric pressure
Ambient temperature: Ordinary temperature
Radial load: 98 N
Rotary speed: 1,000 rpm For the comparison of life of the various bearings to be tested, relative values were calculated with that of No. 23 (Comparative Example 1) corresponding to the conventional rolling bearings entirely made of metal as 1. The results are set forth in Table 1 below.

TABLE 1

| No. | Inner ring and outer ring | rolling body | Retainer | Life (relative value) |
|---|---|---|---|---|
| 1 | SUS440C | SUS440C | PVdF | 50 |
| 2 | ES-1 | ES-1 | PVdF | 70 |
| 3 | SUE440C | Si₃N₄ | PVdF | 180 |
| 4 | ES-1 | Si₃N₄ | PVdF | 220 |
| 5 | ES-1 | ES-1 | PVdF + KTW | 130 |
| 6 | ES-1 | ES-1 | PVdF + carbon fiber | 150 |
| 7 | ES-1 | Si₃N₄ | PVdF + KTW | 500 |
| 8 | ES-1 | Si₃N₄ | PVdF + glass fiber | 480 |
| 9 | ES-1 | SiC | PVdF + ABW | 460 |
| 10 | ES-1 | ZrO₂ | PVdF + carbon fiber | 530 |
| 11 | ES-1 | ES-1 | PVdF + PTFE | 120 |
| 12 | ES-1 | Si₃N₄ | PVdF + MCA | 280 |
| 13 | ES-1 | SiC | PVdF + fluorinated pitch | 300 |
| 14 | ES-1 | ZrO₂ | PVdF + fluorine mica | 260 |
| 15 | ES-1 | Al₂O₃ | PVdF + hBN | 250 |
| 16 | ES-1 | Si₃N₄ | PVdF + KTW + PTFE | 600 |
| 17 | ES-1 | Hard carbon | PVdF + ABW + PTFE | 500 |
| 18 | ES-1 | SIALON | PVdF + carbon fiber + PTFE | 650 |
| 19 | Si₃N₄ | Si₃N₄ | PVdF + KTW + PTFE | 1,300 |
| 20 | ZrO₂ | Si₃N₄ | PVdF + ABW + PTFE | 1,100 |
| 21 | ZrO₂ | ZrO₂ | PVdF + carbon fiber + PTFE | 1,200 |
| 22 | SiC | SiC | PVdF + carbon fiber + PTFE | 1,000 |
| 23 | SUS440C | SUS440C | SUS304 | 1 |
| 24 | SUS440C | SUS440C | Polyimide + glass fiber | 5 |
| 25 | SUS440C | SUS440C | ETFE + KTW | 20 |
| 26 | SUS440C | SUS440C | PFE + glass fiber + MoS₂ | 30 |

As can be seen in Table 1 above, the bearings of Nos. 1 to 22 which is examples according to the present invention exhibit a remarkably prolonged rotation life in pure water as compared with the bearings of Nos. 23 to 26 which is comparative examples.

Further, the comparison of bearings having inner and outer rings made of the same material but retainers made of different materials shows that the bearings of Nos. 5 to 10 having a retainer formed by a resin composition containing a fibrous filler incorporated in PVdF and the bearings of Nos. 10 to 15 having a retainer formed by a resin composition containing a solid lubricant incorporated in PVdF exhibit a longer rotation life in pure water than the bearings of Nos. 1 to 4 having a retainer formed by PvdF alone. It can also be seen that the bearings of Nos. 16 to 22 having a retainer formed by a resin composition containing both a fibrous filler and a solid lubricant incorporated in PVdF exhibit an even longer rotation life than the bearings of Nos. 5 to 15.

Subsequently, retainers were prepared from resin compositions containing as a main component PVdF having a PTFE powder incorporated as a solid lubricant therein in various ratios. These retainers, rolling body prepared from silicon nitride (SiN₄), and inner and outer rings prepared from ES-1 were then used to assemble rolling bearings having the same structure as mentioned above. These bearings were each then subjected to rotary test in pure water to evaluate the life thereof based on vibration value in the same manner as mentioned above. Further, the relationship between the content of the solid lubricant (PTFE) in the resin composition constituting the retainer and the bearing life was determined. The results are as plotted in FIG. 2 as "○".

Subsequently, retainers were prepared from resin compositions containing as a main component PVdF having potassium titanate whisker incorporated as a fibrous filler therein in various ratios. These retainers, rolling body prepared from silicon nitride (SiN₄), and inner and outer rings prepared from ES-1 were then used to assemble rolling bearings having the same structure as mentioned above. These bearings were each then subjected to rotary test in pure water to evaluate the life thereof based on vibration value in the same manner as mentioned above. Further, the relationship between the content of the fibrous filler (potassium titanate whisker) in the resin composition constituting the retainer and the bearing life was determined. The results are as plotted in FIG. 2 as "◊".

Subsequently, retainers were prepared from resin compositions containing as a main component PVdF having carbon fiber incorporated as a fibrous filler therein in various ratios. These retainers, rolling body prepared from silicon nitride ($SiN_4$), and inner and outer rings prepared from ES-1 were then used to assemble rolling bearings having the same structure as mentioned above. These bearings were each then subjected to rotary test in pure water to evaluate the life thereof based on vibration value in the same manner as mentioned above. Further, the relationship between the content of the fibrous filler (carbon fiber) in the resin composition constituting the retainer and the bearing life was determined. The results are as plotted in FIG. 2 as "□".

Subsequently, retainers were prepared from resin compositions containing as a main component PVdF having aluminum borate whisker incorporated as a fibrous filler therein in various ratios. These retainers, rolling body prepared from silicon nitride ($SiN_4$), and inner and outer rings prepared from ES-1 were then used to assemble rolling bearings having the same structure as mentioned above. These bearings were each then subjected to rotary test in pure water to evaluate the life thereof based on vibration value in the same manner as mentioned above. Further, the relationship between the content of the fibrous filler (aluminum borate whisker) in the resin composition constituting the retainer and the bearing life was determined. The results are as plotted in FIG. 2 as "Δ".

Figure 2:
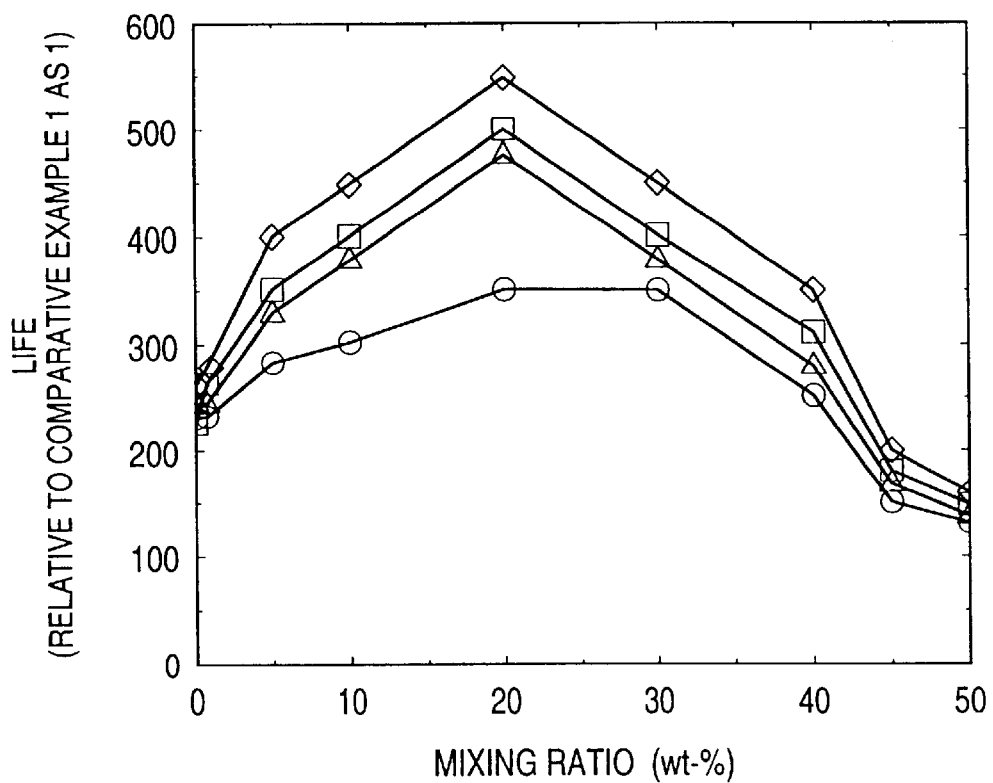
FIG. 2 is a graph illustrating the relationship between the mixing ratio of PTFE powder and fibrous filler in the resin composition constituting the retainer of the bearing and the rotation life of the bearing obtained from the results of test in Example 1.

The life value shown in FIG. 2 is relative to that of No. 23 (Comparative Example 1) as 1 as mentioned above.

As can be seen in FIG. 2, the incorporation of a PTFE powder as a solid lubricant in the resin composition containing PVdF as a main component constituting the retainer in an amount of not more than 40% by weight makes it possible to prolong the rotation life of the bearing in pure water. It can also be seen that the incorporation of potassium titanate whisker, carbon fiber or aluminum borate whisker as a fibrous filler in the resin composition containing PVdF as a main component constituting the retainer in an amount of not more than 40% by weight makes it possible to prolong the rotation life of the bearing in pure water. Moreover, the comparison of the three fibrous fillers shows that potassium titanate whisker can exert the highest effect of prolonging the life when they are incorporated in the same amount.

Subsequently, retainers were prepared from resin compositions containing as a main component PVdF having a PTFE powder incorporated as a solid lubricant therein in a predetermined amount of 20% by weight and potassium titanate whisker, carbon fiber or aluminum borate whisker incorporated therein as a fibrous filler in various ratios. These retainers, rolling body prepared from silicon nitride ($SiN_4$), and inner and outer rings prepared from ES-1 were then used to assemble rolling bearings having the same structure as mentioned above. These bearings were each then subjected to rotary test in pure water to evaluate the life thereof based on vibration value in the same manner as mentioned above.

Further, the relationship between the content of the fibrous filler in the resin composition constituting the retainer and the bearing life was determined. The results are graphically shown in FIG. 3. The results of potassium titanate whisker as fibrous filler are plotted as "□". The results of carbon fiber as fibrous filler are plotted as "○". The results of aluminum borate whisker as fibrous filler are plotted as "◊". The life value shown in FIG. 3 is relative to that of No. 23 (Comparative Example 1) as 1 as mentioned above.

Figure 3:
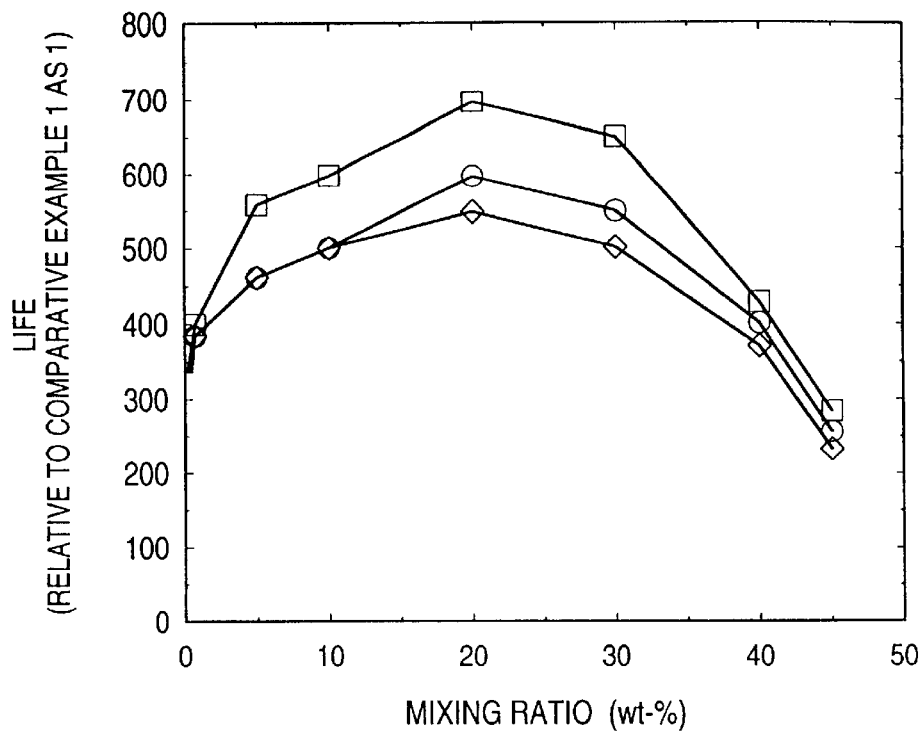
FIG. 3 is a graph illustrating the relationship between the mixing ratio of fibrous filler in the resin composition (containing TEFE powder in a predetermined mixing ratio) constituting the retainer of the bearing and the rotation life of the bearing obtained from the results of test in Example 1.

As can be seen in FIG. 3, the incorporation of a fibrous filler in the resin component constituting the retainer in an amount of not more than 40% by weight makes it possible to prolong the rotation life of the bearing in pure water. Further, the comparison of FIGS. 2 and 3 shows that the resin composition containing both a solid lubricant (PTFE powder) and a fibrous filler exhibits a longer bearing life than that containing a solid lubricant or a fibrous filler alone.

Subsequently, retainers were prepared from resin compositions containing as a main component PVdF having a PTFE powder incorporated as a solid lubricant therein in a predetermined amount of 10% by weight and potassium titanate whisker, carbon fiber or aluminum borate whisker incorporated therein as a fibrous filler in various ratios. These retainers, rolling body prepared from silicon nitride ($SiN_4$), and inner and outer rings prepared from ES-1 were then used to assemble rolling bearings having the same structure as mentioned above. These bearings were each then subjected to rotary test in pure water to evaluate the life thereof based on vibration value in the same manner as mentioned above.

Further, the relationship between the content of the fibrous filler in the resin composition constituting the retainer and the bearing life was determined. The results are graphically shown in FIG. 4. The results of potassium titanate whisker as fibrous filler are plotted as "□". The results of carbon fiber as fibrous filler are plotted as "○". The results of aluminum borate whisker as fibrous filler are plotted as "◊". The life value shown in FIG. 4 is relative to that of No. 23 (Comparative Example 1) as 1 as mentioned above.

Figure 4:
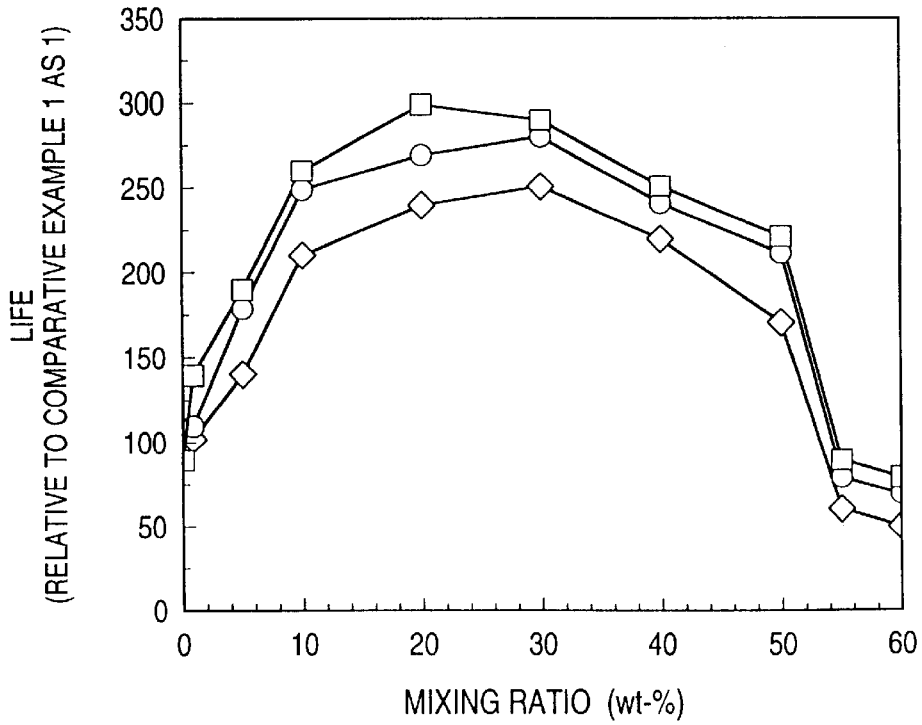
FIG. 4 is a graph illustrating the relationship between the mixing ratio of fibrous filler in the resin composition (containing TEFE powder in a predetermined mixing ratio) constituting the retainer of the bearing and the rotation life of the bearing obtained from the results of test in Example 1.

As can be seen in FIG. 4, if the resin composition constituting the retainer contains a solid lubricant in an amount of 10% by weight, the incorporation of a fibrous filler in the resin component in an amount of not more than 50% by weight makes it possible to prolong the rotation life of the bearing in pure water.

Subsequently, retainers were prepared from resin compositions containing as a main component PVdF having potassium titanate whisker incorporated as a fibrous filler therein in a predetermined amount of 20% by weight and PTFE, MCA, fluorine mica or fluorinated pitch incorporated therein as a solid lubricant in various ratios. These retainers, rolling body prepared from ES-1, and inner and outer rings prepared from ES-1 were then used to assemble rolling bearings having the same structure as mentioned above. These bearings were each then subjected to rotary test in pure water to evaluate the life thereof based on vibration value in the same manner as mentioned above.

Further, the relationship between the content of the solid lubricant in the resin composition constituting the retainer and the bearing life was determined. The results are graphically shown in FIG. 5. The results of PTFE as solid lubricant are plotted as "□". The results of MCA as solid lubricant are plotted as "Δ". The results of fluorine mica as solid lubricant are plotted as "○". The results of fluorinated pitch as solid lubricant are plotted as "◊". The life value shown in FIG. 5 is relative to that of No. 23 (Comparative Example 1) as 1 as mentioned above.

Figure 5:
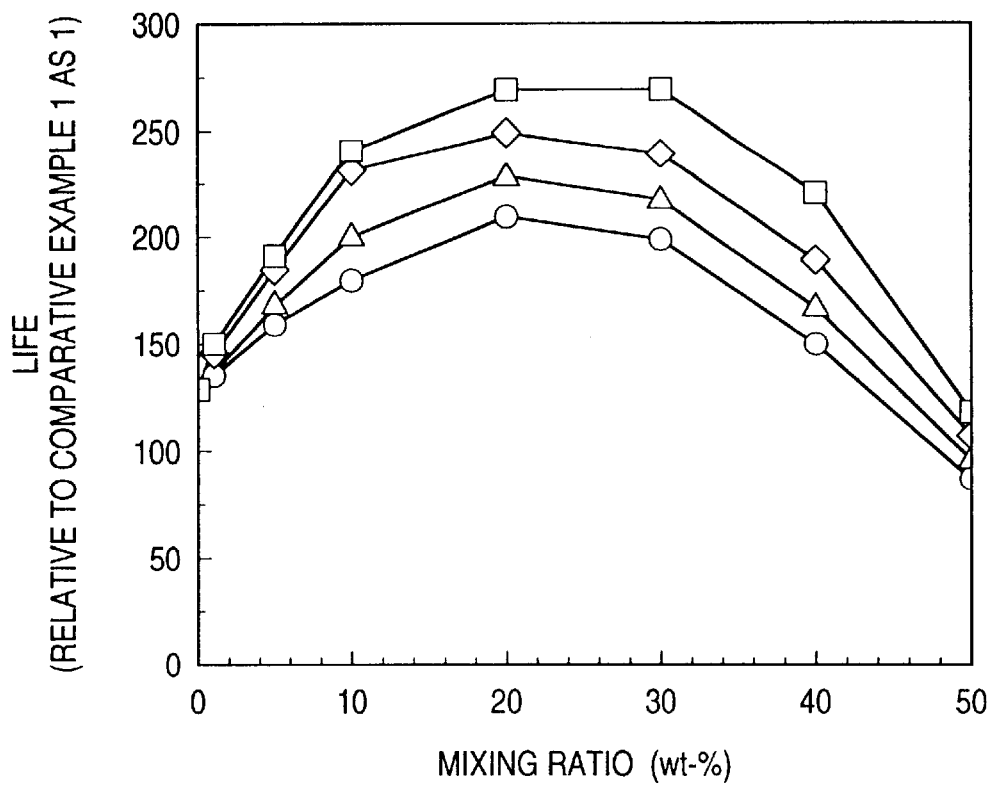
FIG. 5 is a graph illustrating the relationship between the mixing ratio of solid lubricant in the resin composition (containing potassium titanate whisker in a predetermined mixing ratio) constituting the retainer of the bearing and the rotation life of the bearing obtained from the results of test in Example 1.

As can be seen in FIG. 5, if the resin composition constituting the retainer containing a fibrous filler in an amount of 20% by weight, the incorporation of a solid lubricant in the resin component in an amount of not more than 40% by weight makes it possible to prolong the rotation life of the bearing in pure water.

As mentioned above, in accordance with the present invention, the life of a rolling bearing which is which is rendered self-lubricating when a synthetic resin material constituting a retainer is partially transferred thereto under a high load or upon high speed rotation. Further, the mass-producibility of the retainer can be enhanced. Accordingly, the present invention provides a rolling bearing suitable for use in an environment where a pure atmosphere is required, such as clean room, semiconductor producing apparatus, liquid crystal panel producing apparatus and hard disc producing apparatus and in a liquid or an environment where a mist or spray of liquid is present, such as various cleaning apparatus and food processing machines.

Second Embodiment

According to a second embodiment of the present invention, a rolling bearing according to a second embodiment has an inner ring, an outer ring, a rolling body and a retainer, wherein the retainer is obtained by melt-molding a resin composition containing a melt-moldable heat-resistant resin blended with a liquid crystal polymer and a solid lubricant.

The resin composition contains a melt-moldable heat-resistant resin as a main component (in an amount of, e.g., not less than 50% by weight based on the total weight of the resin composition) and a liquid crystal polymer and a solid lubricant as essential components besides the main component.

The formation of a retainer by the resin composition further containing a fibrous filler incorporated therein makes it possible to provide a retainer having a higher mechanical strength to advantage.

In the rolling bearing of the present invention, a solid lubricant film is preferably formed partly or entirely on at least one of the surfaces of the groove on the inner ring, the groove on the outer ring and the rolling body. In this arrangement, the retainer, the rolling body, the inner ring and the outer ring can be prevented from coming in direct contact with each other shortly after the actuation of the bearing until the transfer of the solid lubricant to the surface of the rolling body and the groove on the inner and outer rings. Accordingly, it is possible to keep the bearing fairly lubricated from the initial stage of its operation. Further, since the solid lubricant can be kept being transferred to the surface of these components, the solid lubricant can be prevented from being abraded or falling off from the contact surface during transfer. In this arrangement, the rolling bearing can be kept fairly lubricated over an extended period of time while minimizing the number of particles to be scattered to the exterior of the bearing.

The resin composition preferably satisfies one of the following requirements. (1) The resin composition contains a liquid crystal polymer incorporated therein in an amount of from not less than 5% by weight to no more than 50% by weight, preferably, from not less than 10% by weight to no more than 50% by weight. (2) The resin composition contains a solid lubricant incorporated therein in an amount of from not less than 5% by weight to not more than 40% by weight, preferably, from not less than 10% by weight to no more than 30% by weight. (3) The solid lubricant to be incorporated in the resin composition has an average particle diameter of from not less than 0.1 $\mu$m to not more than 60 $\mu$m, preferably, from not less than 0.1 $\mu$m to not more than 50 $\mu$m, more preferably, from not less than 0.1 $\mu$m to not more than 20 $\mu$m. (4) The fibrous filler to be incorporated in the resin composition has an aspect ratio of from not less than 3 to not more than 200, preferably, from not less than 10 to not more than 100. (5) The solid lubricant film has a thickness of from not less than 0.1 $\mu$m to not more than 15 $\mu$m, preferably, from not less than 0.1 $\mu$m to not more than 10 $\mu$m, more preferably, from not less than 0.1 $\mu$m to not more than 5 $\mu$m.

Examples of the heat-moldable heat-resistant resin to be used as a main component of the resin composition include fluororesin, thermoplastic polyimide (hereinafter referred to as "TPI"), polyether nitrile (hereinafter referred to as "PEN"), polyether ether ketone (hereinafter referred to as "PEEK"), copolymer of polyether ether ketone and polybenzoimidazole (hereinafter referred to as "PEEK-PBI"), and thermoplastic aromatic polyamideimide. These heat-moldable heat-resistant resins may be used singly or in combination.

In particular, examples of the fluororesin include tetrafluoroethylene-perfluoroalkyl vinyl ether copolymer (hereinafter referred to as "PFA"), tetrafluoroethylene-hexafluoropropylene copolymer (hereinafter referred to as "FEP"), polychlorotrifluoroethylene (hereinafter referred to as "PCTFE"), tetrafluoroethylene-ethylene copolymer (hereinafter referred to as "ETFE"), chlorotrifluoroethylene-ethylene copolymer (hereinafter referred to as "ECTFE"), and polyvinylidene fluoride (hereinafter referred to as "PVDF"). These fluororesins may be used singly or in combination. Among these fluororesins, PFE, FEP, and ETFE are excellent in self-lubricating properties and heat resistance and thus can be preferably used as main component of the resin composition. Particularly preferred among these fluororesins is PFA, if used under severe conditions (e.g., when operated at a high rotary speed in a high temperature atmosphere).

Examples of the liquid crystal polymer to be incorporated in the resin composition include semi-aromatic liquid crystal polyester and fully-aromatic liquid crystal polyester. The semi-aromatic liquid crystal polyester has a basic structure represented by the following chemical formula 1. The basic structure consists of two repeating units. As the basic structure there may be used also a semi-aromatic liquid crystal polyester copolymerized with a third component (2,6-naphthalenedicarboxylic acid component).

[Chemical Formula 1]

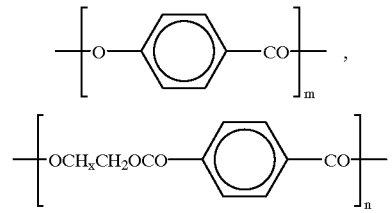

Examples of commercially available semi-aromatic liquid crystal polyesters include "RODRAN" LC-5000 and LC-5050GM, produced by UNITIKA LTD., "IDEMITSU LCP" LCP200J and LCP210J, produced by IDEMITSU PETROCHEMICAL CO., LTD., "NOVACCURALTE" E310, produced by Mitsubishi Chemical Corporation, and "K-LCP", produced by Kawasaki Steel Corp.

The fully-aromatic liquid crystal polyester has a basic structure represented by any of the following chemical formulae. These structures each consists of two or three repeating units.

[Chemical Formula 2]

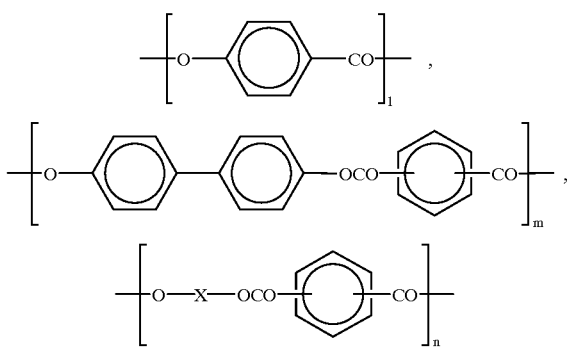

[Chemical Formula 3]

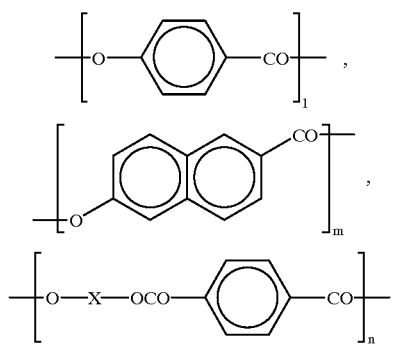

[Chemical Formula 4]

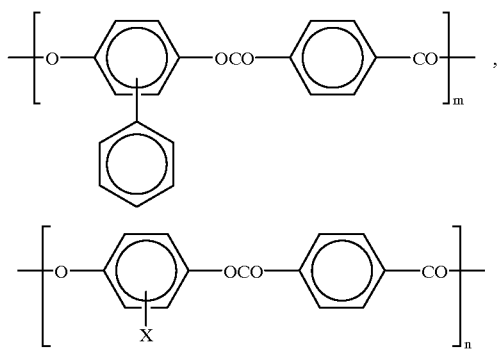

[Chemical Formula 5]

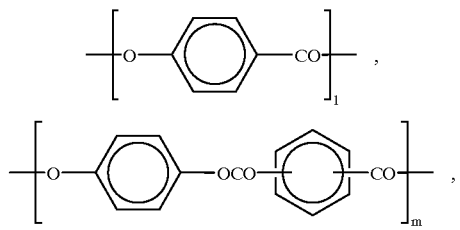

-continued

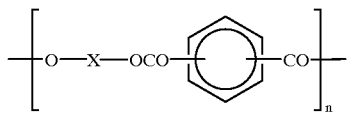

Examples of the fully-aromatic liquid crystal polyester represented by the chemical formula 2 of these chemical formulae include "XYDAR" SRT300 and SRT500, produced by Amoco Corp., "SUMIKASUPER LCP" E2000, produced by SUMITOMO CHEMICAL CO., LTD., and "HAG" and "HGB", produced by TOSOH SUNSTEEL CORP. Examples of the fully-aromatic liquid crystal polyester represented by the chemical formula 3 of these chemical formulae include "VECTRA" A950, produced by Hoechst Celanese Co., Ltd., and "UENO LCP" 1000 and 2000, produced by Ueno Pharmaceutical Co., Ltd.

Examples of the fully-aromatic liquid crystal polyester represented by the chemical formula 4 of these chemical formulae include HX-20000 and HX-3000, produced by Du Pont Inc., and "GRANLAR", produced by Granmont Inc. Examples of the fully-aromatic liquid crystal polyester represented by the chemical formula 5 of these chemical formulae include "ULTRAX" KR4000, produced by BASF, "VICTREX SRP" 1500G and 2300G, produced by ICI Inc., and "POLYSTAL", produced by Bayer Inc.

The content of the liquid crystal polymer in the resin composition is not specifically limited. In practice, however, it is preferably from not less than 5% by weight to not more than 50% by weight. If the content of the liquid crystal polymer in the resin composition falls below 5% by weight, the effect which would be otherwise exerted (fluidity of material during melt molding, melt-moldability, strength) cannot be virtually obtained. On the contrary, if the content of the liquid crystal polymer in the resin composition exceeds 50% by weight, no further improvement in fluidity, moldability and strength can be expected. Further, since the amount of the lubricant component is relatively decreased, sufficient lubricity cannot be obtained.

Examples of the solid lubricant to be incorporated in the resin composition include graphite, graphite fluoride, hexagonal boron nitride, PTFE powder, fluorine mica, gold, silver, lead, tungsten disulfide, and molybdenum disulfide. These solid lubricants may be used singly or in combination. In particular, hexagonal boron nitride, fluorine mica, graphite, PTFE powder, silver, and tungsten disulfide can be used singly or in combination to provide better lubricating properties. Among these solid lubricants, graphite, graphite fluoride and hexagonal boron nitride exhibit excellent lubricating properties mostly at atmospheric pressure. Tungsten disulfide, molybdenum, silver, and lead exhibit excellent lubricating properties in vacuum.

Therefore, if the bearing is used both in vacuum and at atmospheric pressure, the solid lubricant which exhibits excellent lubricating properties mostly at atmospheric pressure and the solid lubricant which exhibits excellent lubricating properties mostly in vacuum can be used in admixture to allow the bearing to be fairly lubricated both in vacuum and at atmospheric pressure.

The use of, as a solid lubricant, a material having a better heat resistance than the heat-moldable heat-resistant resin to be used as main component, such as graphite, hexagonal boron nitride, fluorine mica and silver makes it possible to render the solid lubricant film formed on the rolling body and the groove on the inner and outer rings more heat resistant. As the rolling bearing operates at a high rotary speed, the resulting frictional force developed on the contact area of the rolling body and the inner or outer ring causes a drastic t rise in the temperature of local neighboring areas rather than in the ambient temperature. Even when operated at a high rotary speed, the rolling bearing having the retainer formed by a resin composition containing the solid lubricant incorporated therein can be kept fairly lubricated due to the effect of the solid lubricant film having a high heat resistance thus formed.

The average particle diameter of the solid lubricant to be incorporated in the resin composition is not specifically limited. In practice, however, it is preferably not less than 0.1 $\mu$m to not more than 60 $\mu$m. If the average particle diameter of the solid lubricant falls below 0.1 $\mu$m, the solid lubricant is liable to cohesion of particles when it is mixed with the heat-resistant resin to be used as matrix, occasionally causing the particles to be ununiformly dispersed. On the contrary, if the average particle diameter of the solid lubricant exceeds 60 $\mu$m, the retainer thus formed has a deteriorated surface smoothness and the particles can be easily caught by the surface of contact of the retainer with the rolling body or the surface of contact of the rolling body with the groove. If this happens, the bearing torque can vary or show a rapid increase that terminates rotation.

The content of the solid lubricant in the resin composition is not specifically limited. In practice, however, it is preferably not less than 5% by weight to not more than 40% by weight. If the content of the solid lubricant in the resin composition falls below 50% by weight, the desired effect of solid lubricant (self-lubricating properties of the retainer and lubricity in the bearing due to the transfer of solid lubricant to the rolling body and inner and outer rings) cannot be virtually exerted. On the contrary, if the content of the solid lubricant in the resin composition exceeds 40% by weight, further enhancement of lubricating effect cannot be expected. Further, the resulting deterioration of the mechanical strength of the retainer can occasionally cause the retainer to be abraded more and hence more particles to be scattered to the exterior of the bearing.

Examples of the fibrous filler to be incorporated in the resin composition include aluminum borate whisker, potassium titanate whisker, aramide fiber, aromatic polyimide fiber, liquid crystal polyester fiber, calcium carbonate whisker, graphite whisker, magnesium oxysulfate whisker, glass fiber, carbon fiber, metal fiber, silicon carbide fiber, alumina fiber, boron fiber, silicon carbide whisker, silicon nitride whisker, alumina whisker, aluminum nitride whisker, wollastonite, zinc oxide whisker, magnesium oxide whisker, and mullite whisker.

Referring to the form of fibers constituting the fibrous filler, the fiber preferably has an aspect ratio of not less than 3 to not more than 200. If the fibrous filler to be used has an aspect ratio of less than 3, the resulting retainer cannot be fully reinforced and thus becomes brittle. On the contrary, if the fibrous filler to be used has an aspect ratio of more than 200, the resulting fibrous filler can hardly be uniformly dispersed in the resin composition. Further, the diameter of fibers constituting the fibrous filler is not specifically limited. In practice, however, it is preferably from not less than 0.2 $\mu$m to not more than 30 $\mu$m, more preferably from not less than 0.3 $\mu$m to not more than 5 $\mu$m.

If the fibers to be used have an average diameter of less than 0.2 $\mu$m, the fibers can be agglomerated and ununiformly dispersed in the matrix when mixed with the matrix. On the contrary, if the fibers to be used have an average diameter of more than 30 $\mu$m, the resulting retainer may have a deteriorated surface smoothness. Further, the surface of the components with which the retainer comes in sliding contact and the lubricating film transferred from the retainer can be damaged. The lubricating film which has thus fallen off enters into the gap between the rolling body and the inner or outer ring where it is then ground to form a large number of finely divided abrasion particles. As a result, the number of particles to be scattered to the exterior of the bearing can be drastically increased. If the average diameter of fibers constituting the fibrous filler falls within the range of from not less than 0.3 $\mu$m to not more than 5 $\mu$m, no such a phenomenon can occur.

The content of the fibrous filler in the resin composition is not specifically limited. In practice, however, it is preferably from not less than 5% by weight to not more than 40% by weight. If the content of the fibrous filler in the resin composition falls below 5% by weight, it can exert little or no effect of enhancing the mechanical strength of the retainer. On the contrary, if the content of the fibrous filler in the resin composition exceeds 40% by weight, no further enhancement of the mechanical strength can be expected. Further, fluidity of the resin composition during melt molding is drastically deteriorated. Further, from the standpoint of fluidity during melt molding, the sum of the content of the solid lubricant and the fibrous filler in the resin composition is preferably from not less than 10% by weight to not more than 50% by weight. Even if the content of the solid lubricant and the fibrous filler in the resin composition each are not more than 40% by weight, when the sum of the content of the two components exceeds 50% by weight, the resulting resin composition exhibits a drastically deteriorated fluidity during melt molding.

The fibrous filler to be incorporated in the resin composition may be subjected to surface treatment with a silane-based or titanate-based coupling agent for the purpose of enhancing the adhesivity to the heat-resistant resin as matrix or allowing itself to be uniformly dispersed in the matrix or other surface treatments depending on purposes.

The resin composition may contains various additives such as oxidation inhibitor, heat stabilizer, ultraviolet absorber, optical protector, fire retardant, antistat, fluidity modifier, amorphous tackifier, crystallization accelerator, nucleating agent, pigment and dye incorporated therein so far as the effect of the present invention cannot be impaired.

The method for stirring the resin composition is not specifically limited. The liquid crystal polymer, solid lubricant, and optionally fibrous filler or additive may be successively added to the heat-resistant resin which has been melted with stirring. Alternatively, these materials may be previously mixed in a mixer such as Henschel mixer, tumbler, ribbon mixer and ball mill from which it is then supplied into a melt mixer where it is then melt-kneaded. As such a melt mixer, there may be used a known melt kneading machine such as twin-screw extruder, kneading roll, pressure kneader, Banbury mixer and Brabender Plastograph. The temperature at which melt kneading is effected is arbitrary so far as the heat-resistant resin to be used as main component and the liquid crystal polymer can be thoroughly melted and cannot undergo decomposition.

As the solid lubricant film to be formed on any one of the surface of the groove on the inner and outer rings and the surface of the rolling body, there may be used the same material as that described above as solid lubricant to be incorporated in the resin composition. The formation of the film can be accomplished by a known film-forming technique such as calcining, flame spraying, sputtering, ion plating, vacuum evaporation, electrolytic plating and electroless plating.

The thickness of the film is not specifically limited. In practice, however, it is preferably from not less than 0.1 μm to not more than 15 μm. If the thickness of the film falls below 0.1 μm, the film can be abraded to disappearance before the transfer of the retainer material to the surface of the rolling body or the inner and outer rings followed by the formation of solid lubricant film thereon. As a result, the bearing is operated unlubricated, showing a rapid torque rise that causes seizing. On the contrary, if the thickness of the film exceeds 15 μm, the residual stress developed in the interior of the film during film-forming causes the film to be easily peeled off, making it impossible to exert a lubricating effect. Further, The lubricating film which has thus fallen off enters into the gap between the rolling body and the inner or outer ring where it is then ground to form a large number of finely divided abrasion particles. As a result, the number of particles to be scattered to the exterior of the bearing can be drastically increased. In addition, if the thickness of the film exceeds 15 μm, the film itself supports the load. As a result, the surface of the film undergoes permanent deformation that makes it impossible for the bearing to operate smoothly or causes the drop of rigidity of the contact surface and hence the bearing itself.

In the rolling bearing of the present invention, the material of the inner ring, outer ring and rolling body is not specifically limited. For example, metal materials such as bearing steel and stainless steel and ceramics materials such as silicon nitride ($Si_3N_4$), silicon carbide (SiC), SIALON, partially-stabilized zirconia ($ZrO_2$) and alumina ($Al_2O_3$) can be used.

The second embodiment according to the present invention will be further described in the following examples.

Figure 6:
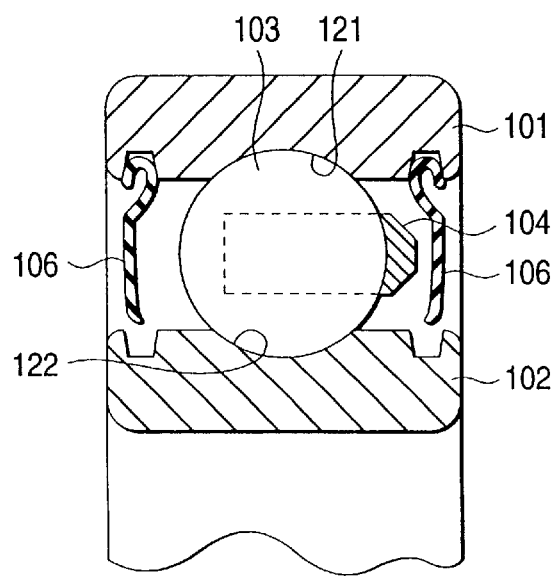
FIG. 6 is a schematic sectional view illustrating a rolling bearing of a second embodiment.

As a bearing to be tested, there was assembled a rolling bearing having a shape shown in FIG. 6 (Model No. 508 of NSK LTD.). This rolling bearing was a shielded deep groove ball bearing comprising an outer ring 101, an inner ring 102, a rolling body 103, a retainer 104, and a shield 106. The rolling bearing had an inner diameter of 8 mm, an outer diameter of 22 mm, and a width of 7 mm. All the inner ring 102, the outer ring 101, and the rolling body 103 were made of SUS440C. The retainer 104 was of crown type. The retainer 104 was formed by injection-molding a resin composition having the formulation shown in Table 2 below. The materials incorporated in these resin compositions are set forth below.

TABLE 2

| No. | Heat-resistant resin | Liquid crystal polymer | Solid lubricant | Fibrous filler | Solid lubricant film |
|---|---|---|---|---|---|
| Example 1 | PFA: 65% | LCP1: 15% | PTFE: 20% | None | None |
| Example 2 | PFA: 65% | LCP1: 15% | WS$_2$: 10% Fluorine mica: 10% | None | None |
| Example 3 | PFA: 65% | LCP1: 15% | PTFE: 10% Fluorine mica: 10% | None | None |
| Example 4 | PFA: 60% | LCP1: 10% | PTFE: 20% | Potassium titanate whisker: 10% | None |
| Example 5 | PFA: 60% | LCP1: 10% | WS$_2$: 10% hBN: 10% | Potassium titanate whisker: 10% | PTFE-dispersed Ni-P film |
| Example 6 | PTFE: 60% | LCP1: 10% | PTFE: 20% | Potassium titanate whisker: 10% | None |
| Example 7 | TPI: 60% | LCP1: 10% | PTFE: 20% | Potassium titanate whisker: 10% | None |
| Example 8 | PEN: 60% | LCP1: 10% | WS$_2$: 10% Fluorine mica: 10% | Potassium titanate whisker: 10% | None |
| Example 9 | PEEK: 60% | LCP1: 10% | Fluorine mica: 10% hBN: 10% | Potassium titanate whisker: 10% | None |
| Example 10 | PEEK-PBI: 60% | LCP1: 10% | PTFE: 10% | Potassium titanate whisker: 10% | None |
| Example 11 | PFA: 60% | LCP2: 10% | PTFE: 10% HBN: 10% | Potassium titanate whisker: 10% | None |
| Example 12 | PFA: 60% | LCP1: 10% | PTFE: 10% WS$_2$: 10% | Carbon fiber: 10% | None |
| Comparative Example 1 | PFA: 100% | None | None | None | None |
| Comparative Example 2 | PFA: 70% | None | Fluorine mica: 30% | None | None |
| Comparative Example 3 | PFA: 70% | None | None | Potassium titanate whisker: 30% | None |
| Comparative Example 4 | PPS: 60% | None | PTFE: 20% | Potassium titanate whisker: 20% | None |

* The term "%" as used hereinabove is meant to indicate "% by weight".

PFA: "Neoflon PFA AP-201", produced by DAIKIN INDUSTRIES LTD.

ETFE: "Neoflon ETFE EP-520", produced by DAIKIS INDUSTRIES LTD.

TPI: "Auram 400", produced by Mitsui Toatsu Chemicals, Inc.

PEN: "ID300", produced by Idemitsu Material Co., Ltd.

PEEK: "Victrex PEEK 150G", produced by Victrex-MC Inc.

PEEK-PBI: "Celazole TU-60", produced by Hoechst Celanese Co., Ltd.

LCP1 (fully-aromatic liquid crystal polymer): "Sumikasuper LCP E6000", produced by SUMITOMO CHEMICAL CO., LTD.

LCP2 (semi-aromatic liquid crystal polymer): "NOVALCCURATE E310", produced by Mitsubishi Chemical Corporation PPS: "Lyton R-6", produced by Phillips Petroleum International Limited PTEFE powder: "Lubron L-5", produced by DAIKIN INDUSTRIES LTD. (average particle diameter: 0.2 μm Tungsten disulfide (WS$_2$): "Tunmic A", produced by Nihon Junkatsuzai Co., Ltd. (average particle diameter: 2 μm)

Fluorine mica: "Synthetic Mica PDM-800", produced by TOPY INDUSTRIES, LTD. (average particle diameter: 10 µm)

Hexagonal boron nitride (hBN): "Shin-etsu Boron Nitride KBN-10", produced by Shin-Etsu Chemical Co., Ltd. (average particle diameter: 10 µm)

Carbon fiber: "Kurekachop M-102S", produced by Kureha Chemical Industry Co., Ltd. (average fiber diameter: 14.5 µm; length: 0.2 mm).

Potassium titanate whisker: "Tismo D-101", produced by Otsuka Chemical Co., Ltd. (average fiber diameter: 0.3–0.6 µm; length: 10–20 µm).

The mixing of the resin components was carried out in such a manner that the fibrous filler cannot break. In some detail, the resin components except the fibrous filler are dry-mixed in a Henschel mixer. The mixture is then put into a twin-screw extruder. The fibrous filler is supplied into the twin-screw extruder through a constant rate side feeder so that it is kneaded with the mixture. The mixture thus kneaded is then extruded to form pellets.

The pelletized resin composition thus obtained was supplied into an injection molding machine from which it was then injection-molded under optimum conditions depending on the kind of the resin composition.

In Example 5, the surface of the groove on the outer ring 121 and the groove on the inner ring 122 were entirely electrolessly plated with an Ni—P film having PTFE particles dispersed therein to a thickness of 1.0 µm.

These rolling bearings thus assembled were each then subjected to rotary test under the following conditions using a bearing rotary testing machine produced by NSK LTD. Thus, these rolling bearings were evaluated for torque stability and torque life.

<Rotary test conditions>
  Atmospheric pressure: $1 \times 10^{-4}$ Pa
  Ambient temperature: 200° C. or 250° C.
  Axial load: 19.6 N
  Radial load: 1.96 N
  Rotary speed: 1,000 rpm For the measurement of torque, a bearing torque meter was used. In some detail, the bearing to be tested was rotated at 1,000 rpm. During this operation, the bearing was measured for torque value using a strain gauge. The ratio (T1/T2) of the torque value T1 measured at the initial stage of rotation to the torque value T2 measured 10 minutes after the actuation of the bearing when the torque value is almost settled (steady value) was then calculated. This ratio was then used to evaluate the torque stability. For the measurement of torque life, the test was terminated at the point when the torque value reached more than three times the steady value. The total number of rotations made so far was determined as torque life.

Figure 7:
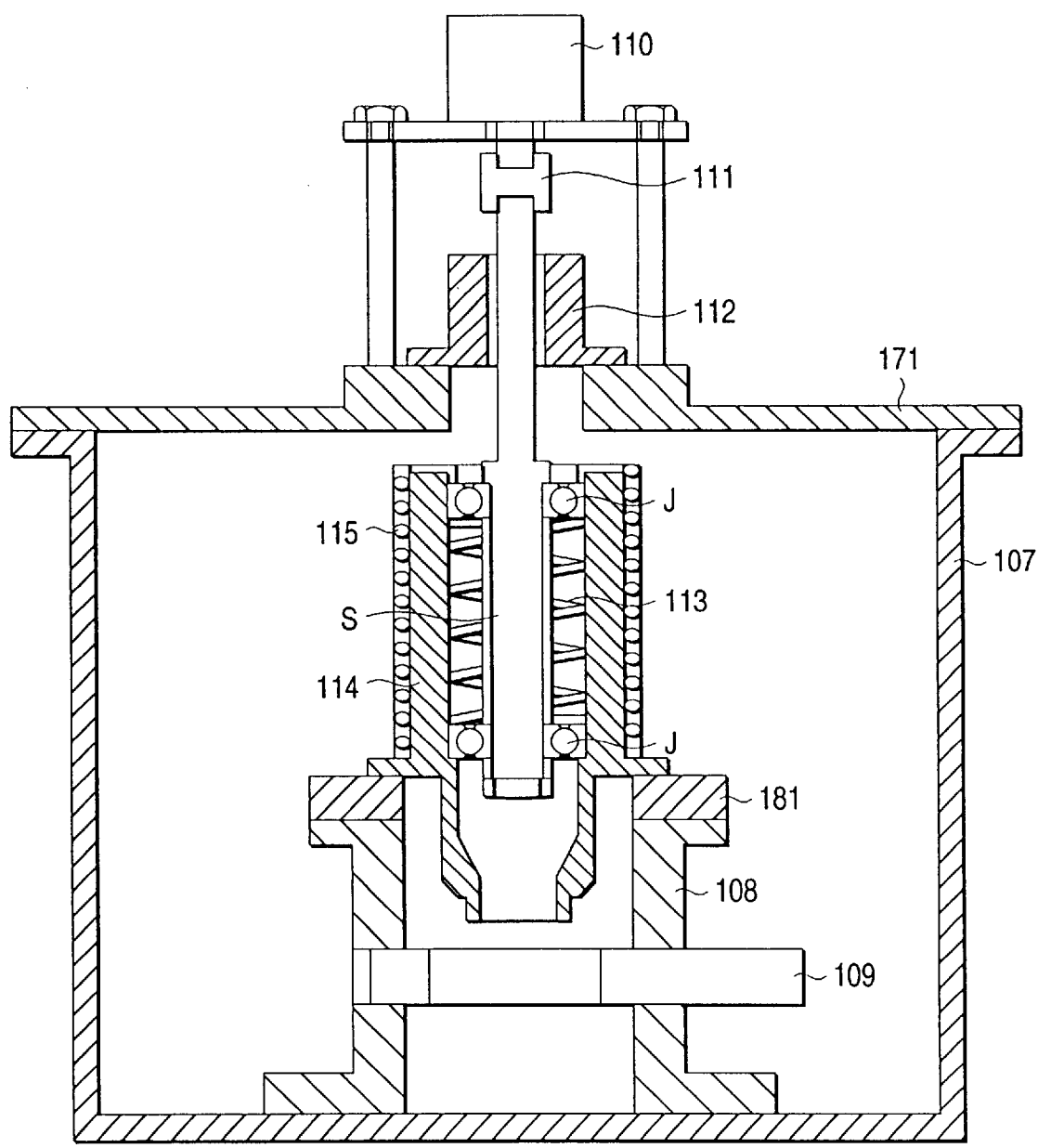
FIG. 7 is a schematic sectional view illustrating the structure of the testing machine used in the second embodiment.

Using a testing machine shown in FIG. 7, the various rolling bearings were each measured for the amount of dust scattered. This testing machine has a vacuum chamber 107, a table 108 provided in the vacuum chamber 107, a laser beam scattering type particle counter 109 provided on the table 108, and a motor 110, a coupling 111 and a magnetic fluid seal 112 provided outside the vacuum chamber 107. In the test, two of the same kind of bearings J to be tested are mounted on the shaft S at the forward end and in the vicinity of the central part thereof, respectively. A coiled spring S is provided interposed between the two bearings. In this arrangement, the two bearings are fitted in a housing 114 while being axially loaded. A heating apparatus 115 is then mounted on the periphery of the housing 114. The unit thus assembled is put in the vacuum chamber 7 where it is then fixed to the top 181 of the table 108. The vacuum chamber 107 is then covered by a cover 171. The motor 110 is then actuated to rotate the shaft S for 100 hours. The amount of dust thus scattered is then measured by the particle counter 109.

The testing conditions are as follows:
<Dusting test conditions>
  Atmospheric pressure: $1 \times 10^{-4}$ Pa
  Ambient temperature: 200° C. or 250° C.
  Axial load: 19.6 N
  Rotary speed: 1,000 rpm The results of these tests are set forth altogether in Table 3. The amount of dust scattered set forth in Table 2 is represented relative to that of Comparative Example 1 at a temperature of 200° C. as 100.

TABLE 3

| No. | Ambient temperature: 200° C. | | | Ambient temperature: 250° C. | | |
|---|---|---|---|---|---|---|
| | Torque stability | Torque life | Amount of dust scattered | Torque stability | Torque life | Amount dust of scattered |
| Example 1 | 1.3 | $6.5 \times 10^8$ | ≦10 | 1.4 | $7.5 \times 10^7$ | ≦10 |
| Example 2 | 1.3 | $6.6 \times 10^8$ | ≦10 | 1.3 | $7.5 \times 10^7$ | ≦10 |
| Example 3 | 1.3 | $6.9 \times 10^8$ | ≦10 | 1.3 | $7.7 \times 10^7$ | ≦10 |
| Example 4 | 1.4 | $7.5 \times 10^8$ | ≦10 | 1.4 | $8.5 \times 10^7$ | ≦10 |
| Example 5 | 1.1 | $9.7 \times 10^8$ | ≦10 | 1.1 | $1.2 \times 10^8$ | ≦10 |
| Example 6 | 1.5 | $3.0 \times 10^8$ | ≦10 | 1.7 | $5.0 \times 10^5$ | ≦30 |
| Example 7 | 1.4 | $8.5 \times 10^8$ | ≦10 | 1.4 | $9.8 \times 10^7$ | ≦10 |
| Example 8 | 1.3 | $8.0 \times 10^8$ | ≦10 | 1.3 | $9.0 \times 10^7$ | ≦10 |
| Example 9 | 1.3 | $8.1 \times 10^8$ | ≦10 | 1.3 | $9.1 \times 10^7$ | ≦10 |
| Example 10 | 1.3 | $8.3 \times 10^8$ | ≦10 | 1.3 | $9.4 \times 10^7$ | ≦10 |
| Example 11 | 1.4 | $5.8 \times 10^8$ | ≦10 | 1.3 | $6.0 \times 10^7$ | ≦10 |
| Example 12 | 1.5 | $7.6 \times 10^8$ | ≦20 | 1.7 | $4.3 \times 10^7$ | ≦30 |
| Comparative Example 1 | 2.2 | $5.2 \times 10^5$ | 100 | 2.0 | $6.7 \times 10^4$ | 200 |
| Comparative Example 2 | 1.9 | $3.3 \times 10^6$ | 50 | 1.8 | $4.3 \times 10^4$ | 80 |
| Comparative Example 3 | 2.1 | $6.0 \times 10^5$ | 80 | 2.2 | $5.5 \times 10^4$ | 150 |
| Comparative Example 4 | 2.0 | $9.2 \times 10^5$ | 500 | 2.1 | $2.2 \times 10^4$ | 1,000 |

The results set forth in Table 3 show that the bearings of Examples 1 to 12 corresponding to the bearing according to the present invention exhibit a higher torque stability and a longer torque life and allow less dust particles to be scattered to the exterior thereof than those of Comparative Examples 1 to 4. Accordingly, these bearings can be used in a severe atmosphere where no lubricants or greases can be used and can be preferably used even in places where a pure atmosphere is required.

Retainers were formed by resin compositions containing PFA as a main component, LCP1 as a liquid crystal polymer, a PTFE powder as a solid lubricant and a potassium titanate whisker as a fibrous filler and having various LCP1 mixing ratios, PTFE powder mixing ratios, PTFE powder average particle diameters and potassium titanate whisker aspect ratios. Rolling bearings were then prepared from these retainers in the same manner as mentioned above. These rolling bearings were each subjected to rotary test and dusting test at an ambient temperature of 200° C. to determine the torque life and the amount of dust scattered. The results are shown in FIGS. 8 to 11.

Figure 8:
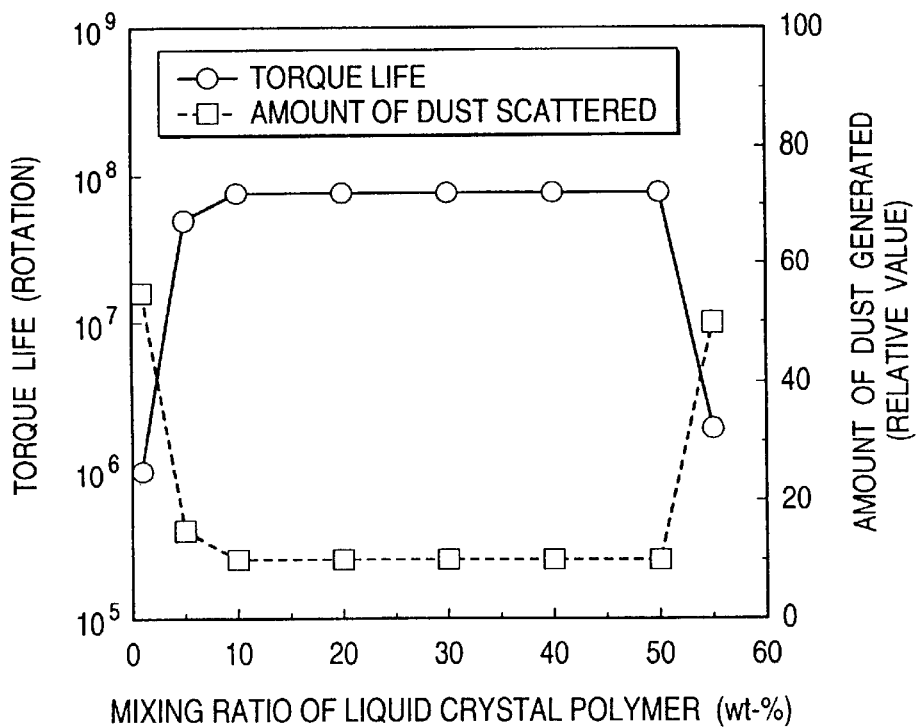
FIG. 8 is a graph illustrating the relationship between the mixing ratio of liquid crystal polymer and the torque life and amount of dust scattered determined from the results of the test in the second embodiment.

FIG. 8 is a graph illustrating the relationship between the mixing ratio of liquid crystal polymer and the torque life and amount of dust scattered. With the content of PTFE powder (average particle diameter: 0.2 μm) kept constant to 20% by weight based on the weight of the resin composition and the content of potassium titanate whisker (aspect ratio: 15–70) kept constant to 10% by weight based on the weight of the resin composition, the content of the liquid crystal polymer in the resin composition was varied as shown in FIG. 8. The balance was PFA. This graph shows that if the content of the liquid crystal polymer in the resin composition constituting the case is from not less than 5% by weight to not more than 50% by weight, a rolling bearing excellent in torque life and dusting can be provided.

Figure 9:
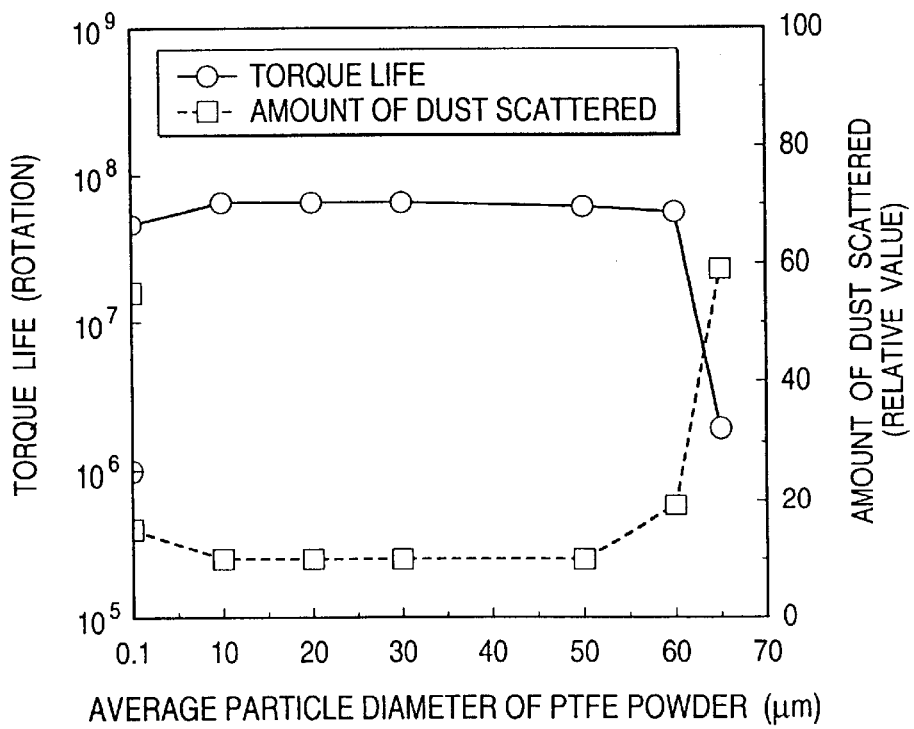
FIG. 9 is a graph illustrating the relationship between the average particle diameter of PTFE powder and the torque life and amount of dust scattered determined from the results of the test in the second embodiment.

FIG. 9 is a graph illustrating the relationship between the average particle diameter of PTFE powder and the torque life and amount of dust scattered. The resin composition contains PFA in an amount of 65% by weight, LCP1 in an amount of 15% by weight and PTFE powder in an amount of 20% by weight and is free of fibrous filler. This graph shows that if the average particle diameter of the solid lubricant powder in the resin composition constituting the case is from not less than 0.1 μm to not more than 60 μm, a rolling bearing excellent in torque life and dusting can be provided.

Figure 10:
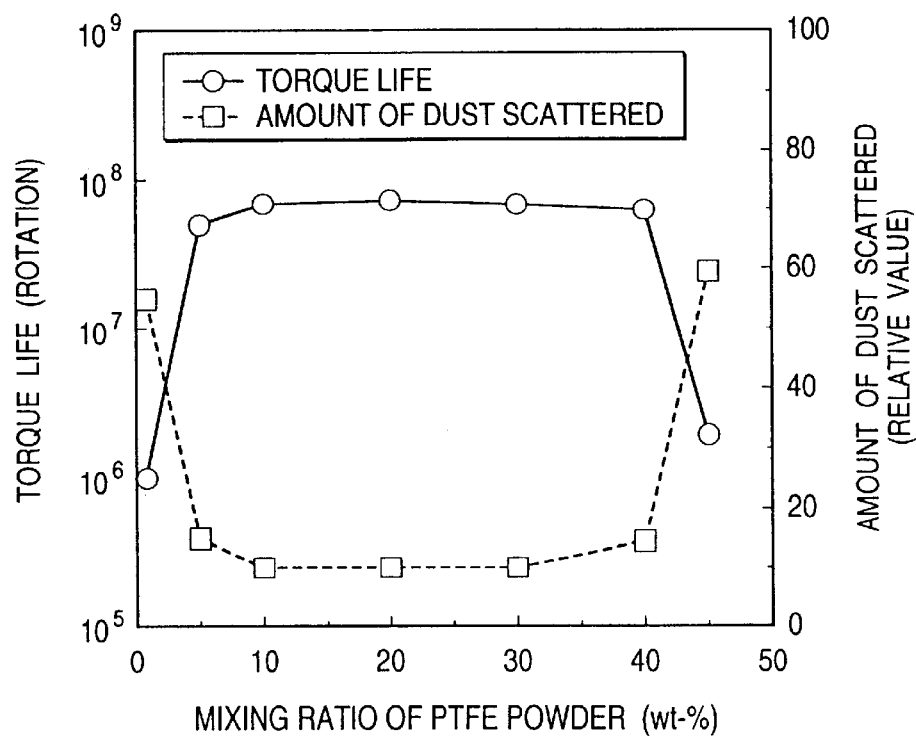
FIG. 10 is a graph illustrating the relationship between the mixing ratio of PTFE powder and the torque life and amount of dust scattered determined from the results of the test in the second embodiment.

FIG. 10 is a graph illustrating the relationship between the mixing ratio of PTFE powder and the torque life and amount of dust scattered. With the content of potassium titanate whisker (aspect ratio: 15–70) in the resin composition kept constant to 20% by weight, the content of PTFE powder (average particle diameter: 0.2 μm) was varied as shown in FIG. 10. The balance was PFA and LCP1. The ratio of PFA to LCP1 was kept constant to 5:1. This graph shows that if the content of the solid lubricant in the resin composition constituting the case is from not less than 5% by weight to not more than 40% by weight, a rolling bearing excellent in torque life and dusting can be provided.

Figure 11:
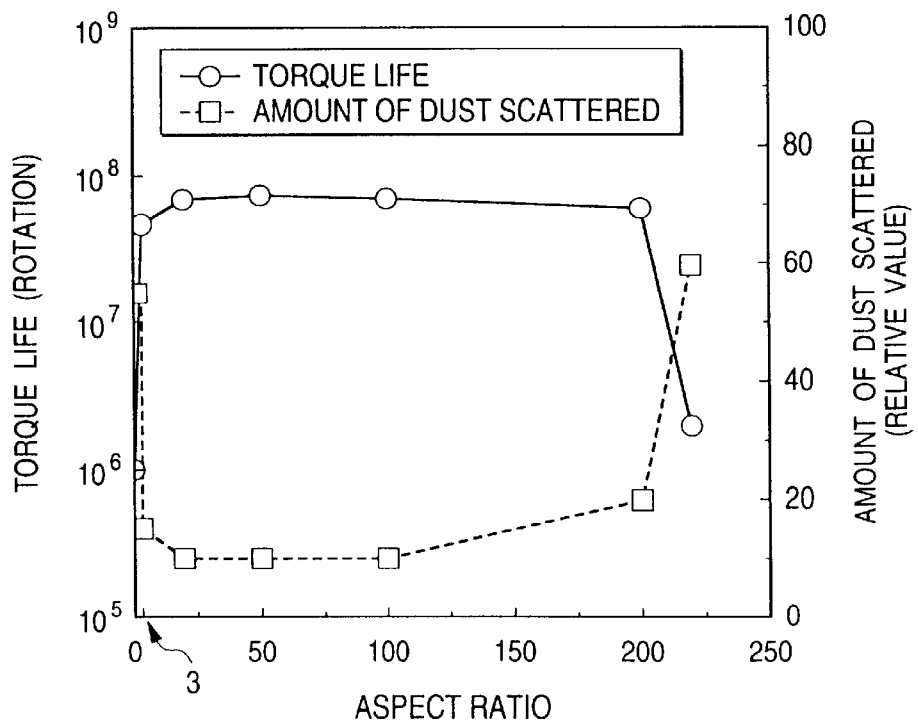
FIG. 11 is a graph illustrating the relationship between the aspect ratio of fibrous filler and the torque life and amount of dust scattered determined from the results of the test in the second embodiment.

FIG. 11 is a graph illustrating the relationship between the aspect ratio of fibrous filler and the torque life and amount of dust scattered. The resin composition contains PFA in an amount of 60% by weight, LCP1 in an amount of 10% by weight, PTFE powder (average particle diameter: 0.2 μm) and potassium titanate whisker in an amount of 10% by weight. This graph shows that if the aspect ratio of the fibrous filler in the resin composition constituting the retainer is from not less than 3 to not more than 200, a rolling bearing excellent in torque life and dusting can be provided.

In the embodiment, as the melt-molding process for the preparation of retainer there is used injection molding process, which gives particularly excellent productivity. Thus, the production cost of retainer can be remarkably reduced as compared with the conventional process involving machining. However, the retainer constituting the rolling bearing of the present invention is riot limited to one formed by injection molding. The retainer of the present invention may be formed by a known melt molding process such as compression molding and transfer molding.

As mentioned above, the rolling bearing according to the present invention can be kept fairly lubricated with little particles being scattered to the exterior thereof even in a high temperature atmosphere over an extended period of time and can be produced at low cost. Accordingly, the rolling bearing according to the present invention can be used in a severe atmosphere where no lubricants or greases can be used (e.g., at high temperatures, in vacuum, in a special atmosphere, at extremely low temperatures, under radiation) and can be preferably used even in places where a pure atmosphere is required.

What is claimed is:

1. A rolling bearing comprising a retainer for a rolling body, said retainer being obtained by melt-molding a resin composition comprising a heat-resistant resin capable of melting as a main component, wherein said retainer is obtained by melt-molding a polyvinylidene fluoride resin or a resin composition comprising a polyvinylidene fluoride resin as a main component.

2. A rolling bearing according to claim 1, wherein said retainer contains at least one of solid lubricant and fibrous filler incorporated therein.

3. A rolling bearing according to claim 2, wherein the sum of the content of the solid lubricant and the fibrous filler in the resin composition is not more than 60% by weight.

4. A rolling bearing according to claim 2, wherein a content of the solid lubricant is in the range of 5% by weight to 40% by weight, and an average particle diameter of the solid lubricant is in the range of 0.1 μm to 60 μm.

5. A rolling bearing according to claim 2, wherein an aspect ratio of the fibrous filler is in the range of 3 to 200, and a diameter of fibers constituting the fibrous filler is in the range of 0.2 μm to 30 μm.

* * * * *